United States Patent [19]

Tseng

[11] Patent Number: 5,664,792
[45] Date of Patent: Sep. 9, 1997

[54] TOOL FIXING MECHANISM

[76] Inventor: Hans Tseng, P.O. Box 2103, Taichung, Taiwan

[21] Appl. No.: 689,251

[22] Filed: Aug. 7, 1996

[51] Int. Cl.$^6$ ............................ B23G 3/18; B23B 31/103
[52] U.S. Cl. .................... 279/77; 30/338; 30/339; 16/114 R; 403/329; 403/330
[58] Field of Search .................. 30/337–339; 403/325, 403/326, 327, 329, 330; 24/115 G, 136 L; 279/77, 79; 16/114 R

[56] References Cited

U.S. PATENT DOCUMENTS

| 929,067 | 7/1909 | Williamson | 403/325 |
| 1,851,843 | 3/1932 | Inman | 279/79 |
| 4,466,377 | 8/1984 | Kolb et al. | 403/329 |

FOREIGN PATENT DOCUMENTS 681182  8/1979  U.S.S.R. .................. 403/330

Primary Examiner—Steven C. Bishop

[57] ABSTRACT

This disclosure concerns a tool fixing mechanism including a hollow grip and a resilient clip body. The grip has a front end and a rear end. The front end is formed with a slot, while the rear end is formed with a cross-shaped socket. Two windows are respectively formed on the top and bottom walls of the rear end of the grip. The resilient clip body is located in the cross-shaped socket of the grip. The resilient clip body is formed with two lugs extending out of the windows of the grip. Therefore, if a user depresses the lugs, the resilient clip body is closed or stretched open so as to fixedly latch or release a tool inserted in the slot of the front end of the grip.

3 Claims, 4 Drawing Sheets

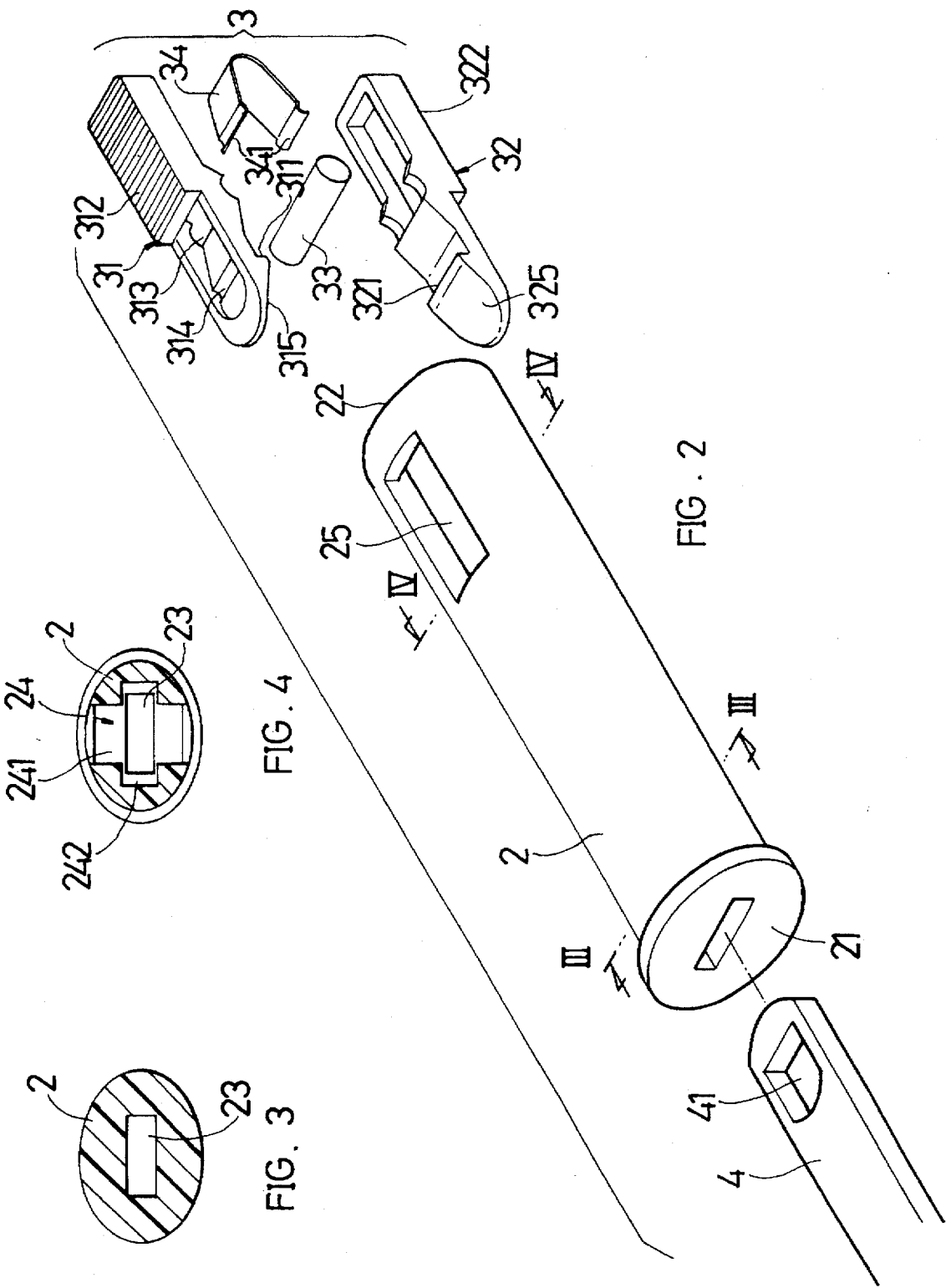

5,664,792

TOOL FIXING MECHANISM

BACKGROUND OF THE INVENTION

The present invention relates to a tool fixing mechanism in which a resilient clip body is disposed in a hollow grip for fixedly clip or release a tool inserted in the grip.

FIG. 1 shows a conventional tool fixing mechanism including a grip 11, a leaf spring 13 and a control button 14. The grip 11 is formed with an axially extending insertion receptacle 15 with non-circular cross-section. The insertion receptacle 15 forward extends from a rear open end of the grip 11. An insertion article 12 having the same profile as the insertion receptacle 15 is inserted therein. The rear end of the insertion article 12 is formed with a hole 16 and a guiding slope face 17. The leaf spring 13 is located in the grip 11 with its rear end secured to the grip 11. The middle portion of the leaf spring 13 is disposed with a hook projection 18 inclinedly positioned on the axis of the receptacle 15. The control button 14 is disposed at the rear end of the leaf spring 13 for controlling the displacement of the hook projection 18. Accordingly, when the insertion article 12 is inserted into the receptacle 15 and moved rearward, the guiding slope face 17 downward pushes the hook projection 18 of the leaf spring 13. Thereafter, the hook projection 18 bounds up into the hole 16 so as to latch the insertion article 12 and prevent the same from axially displacing relative to the insertion receptacle 15.

According to the above arrangement, the front end of the leaf spring 13 is secured to the grip 11, while the rear end of the leaf spring 13 is bent upward to connect with the control button 14 in a suspending state. The leaf spring 13 has a considerably large length, whereby when the insertion article 12 suffers a reversely directed force, the hook projection 18 of the leaf spring 13 is reversely moved. This may lead to deformation of the leaf spring 13.

SUMMARY OF THE INVENTION

It is therefore a primary object of the present invention to provide a tool fixing mechanism including a hollow grip and a resilient clip body. The grip has a front end and a rear end. The front end is formed with a slot, while the rear end is formed with a cross-shaped socket. The resilient clip body is located in the cross-shaped socket of the grip, including an upper and a lower plate bodies and a resilient member. Two windows are respectively formed on the top and bottom walls of the grip. The upper and lower plate bodies are respectively formed with two reverse hooks and two lugs. The reverse hooks are resiliently engaged into a hole of an insertion article so as to fix the insertion article in the grip. The lugs of the upper and lower plate bodies protrude out of the windows of the grip and the front ends of the upper land lower plate bodies abut against the wall between the slot and the cross-shaped socket so as to resist against a reversely pulling force of the insertion article. Therefore, the pulling force is distributed over the upper and lower plate bodies so as to avoid damage of the reverse hooks of the upper and lower plate bodies.

The present inventions can be best understood through the following description and accompanying drawings, wherein:

BRIEF DESCRIPTION OF THE DRAWINGS

FIG. 2 is a perspective exploded view of the present invention;

FIG. 3 is a sectional view taken along line III—III of FIG. 2;

FIG. 4 is a sectional view taken along line IV—IV of FIG. 2;

DETAILED DESCRIPTION OF THE PREFERRED EMBODIMENT

Figure 1:
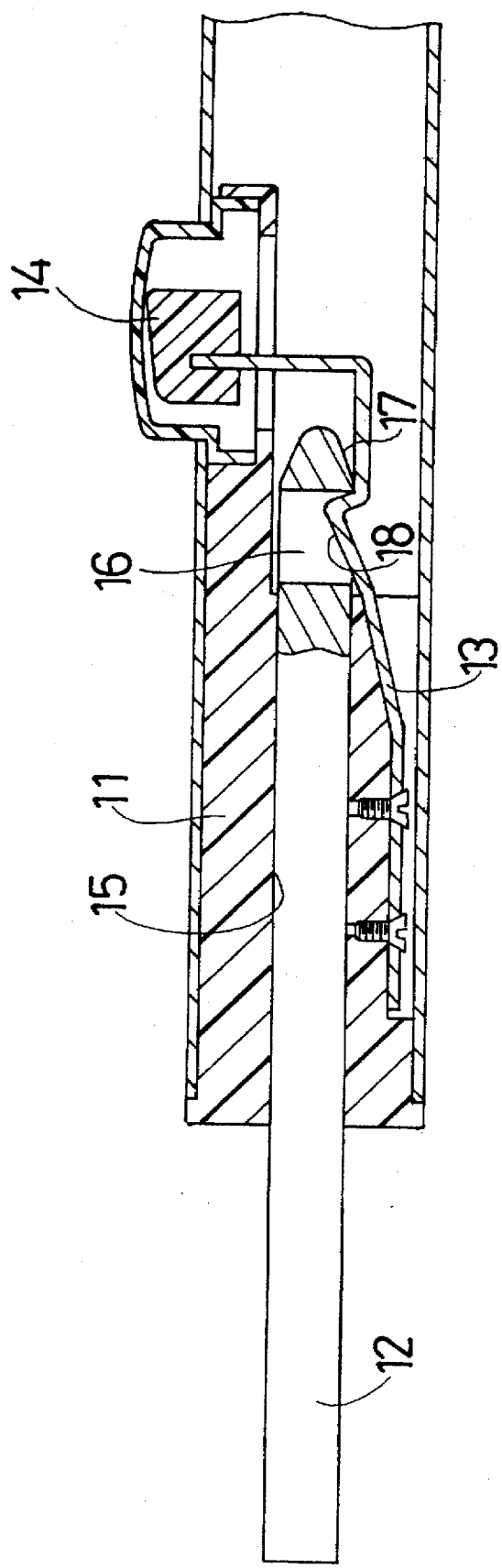
FIG. 1 is a sectional view of a conventional tool fixing mechanism.
Figure 5:
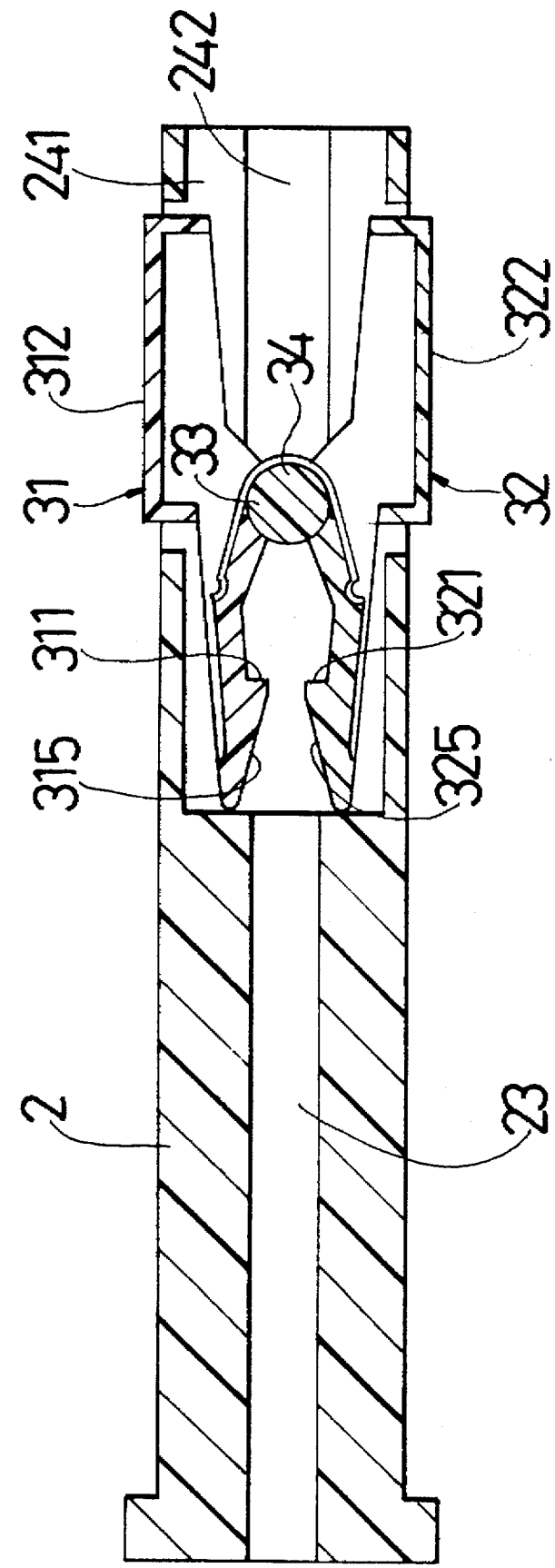
FIG. 5 is an axially sectional view of the present invention.

Please refer to FIGS. 2 to 5. The tool fixing mechanism of the present invention includes a hollow grip 2 and a resilient clip body 3.

The grip 2 has an elliptic cross-section, a front end 21 and a rear end 22. The front end 21 is formed with a slot 23, while the rear end 22 is formed with a cross-shaped socket 24. The slot 23 and the cross-shaped socket 24 are adjacent to each other at a predetermined portion of the grip 2. Two windows 25 are respectively formed on the top and bottom walls of the rear end 22 of the grip 2 in the short axis direction of the elliptic cross-section.

The resilient clip body 3 is located in the cross-shaped socket 24 of the grip 2, consisting of an upper plate body 31, a lower plate body 32, a fixing shaft 33 and a resilient member 34. The fixing shaft 33 is connected at the middle portions of the upper and lower plate bodies 31, 32 and disposed at the pivot portion via the resilient member 34. The upper and lower plate bodies 31, 32 are positioned in the longitudinal space 241 of the cross-shaped socket 24, while the fixing shaft 33 is located in the transverse space 242 thereof. In this embodiment, the resilient member 34 is a V-shaped steel plate with a notch. Each free end of the steel plate is formed with a convex strip 341 on an inner side. A through hole 313, 323 is formed between the middle portion and the rear end of each of the upper and lower plate bodies 31, 32. The two free ends of the resilient member 34 are respectively passed through the through holes 313, 323 of the upper and lower plate bodies. 31, 32 with the convex strips 341 engaged with the recesses 314, 324 formed on outer sides of the front ends of the upper and lower plate bodies 31, 32. Therefore, the opening of the resilient member is faced to the front ends of the upper and lower plate bodies. The opposite inner sides of the front ends of the upper and lower plate bodies 31, 32 are respectively formed with two reverse hooks 311, 321 inclined toward the rear ends. Each reverse hook 311, 321 is disposed with a back slope face 315, 325. The opposite outer sides of the rear ends of the upper and lower plate bodies 31, 32 are respectively formed with two lugs 312, 322 extending out of the windows 25 of the grip 2.

Figure 6:
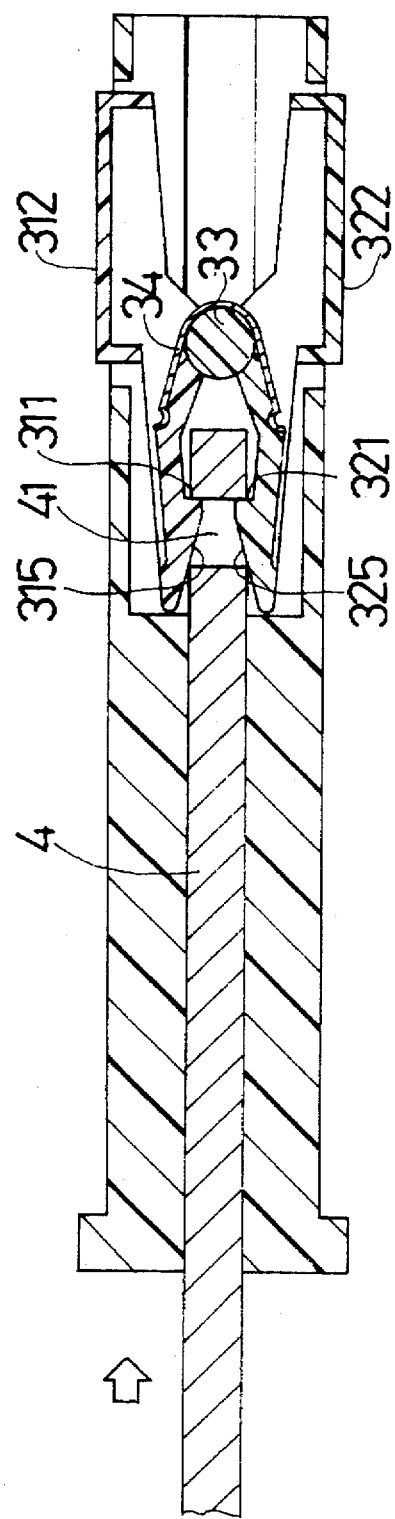
FIG. 6 is a sectional view showing that the tool is fixedly latched in the grip of the tool fixing mechanism of the present invention.

Referring to FIG. 6, according to the above arrangement, an insertion portion 4 of a tool is formed with a hole 41 at rear end. When the rear end of the insertion portion 4 is inserted into the slot 23 of the front end of the grip 2, the rear end pushes the slope faces 315, 325 of the reverse hooks 311, 321 of the upper and lower plate bodies 31, 32 so as to stretch open the upper and lower plate bodies 31, 32, whereby the two reverse hooks 311, 321 are engaged into the hole 41 by means of the resilient member 34 so as to restrict the insertion portion 4 from axial displacement.

Figure 7:
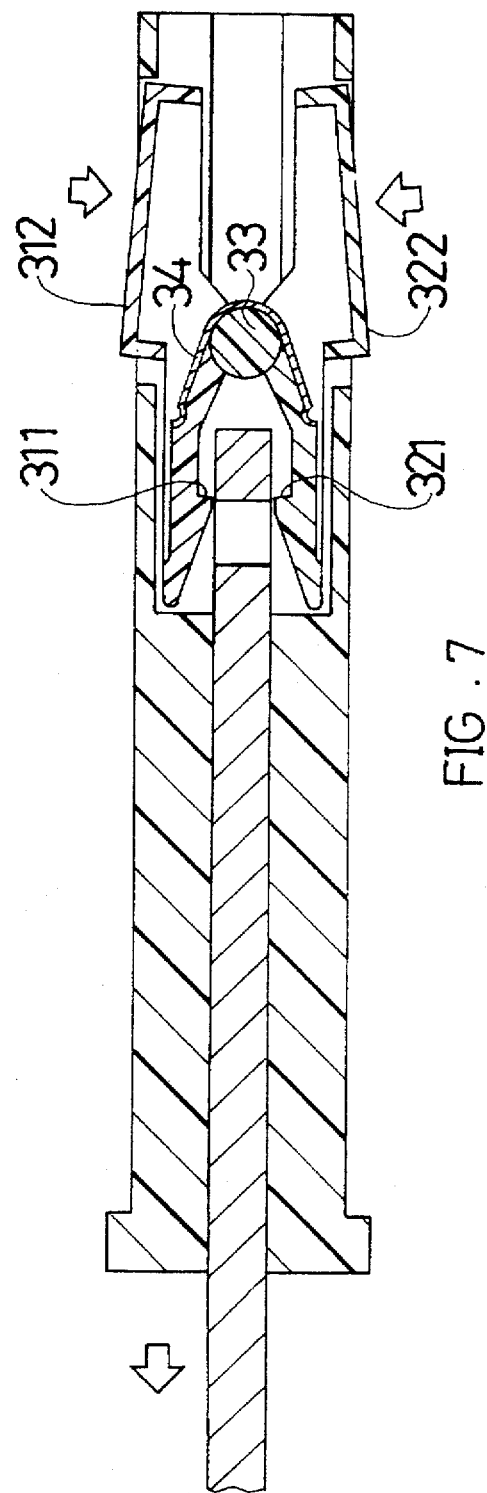
FIG. 7 is a sectional view showing that the tool is released from the grip of the tool fixing mechanism of the present invention.

On the contrary, referring to FIG. 7, when it is desired to extract and replace the tool, the lugs 312, 322 protruding out of the windows 25 are depressed at the same time in a direction as shown by the arrow, whereby the lugs 312, 322 are moved inward against the resilient force of the resilient member 34, making the two reverse hooks 311, 321 respectively move upward and downward and disengage from the hole 41. Accordingly, the insertion portion 4 can be axially withdrawn from the grip 2.

It should be noted that the upper and lower plate bodies of the present invention are simultaneously compressed by the resilient member to hold and latch the insertion portion by a better fixing effect than the conventional device. Moreover, the lugs of the upper and lower plate bodies extend out of the windows of the grip and the fixing shaft is located in the transverse space of the cross-shaped socket, while the front ends of the upper and lower plate bodies are located in the longitudinal space of the cross-shaped socket. Therefore, the upper and lower plate bodies are positioned are limited in the cross-shaped socket of the grip and prevented from being axially displaced. Accordingly, when the insertion portion is moved in a reverse direction to pull the reverse hooks, in addition to the resilient force of the resilient member, the lugs are stopped by the walls of the windows from being displaced. This avoids damage of the upper and lower plate bodies or the resilient member by external force for extracting the insertion portion.

It is to be understood that the above description and drawings are only used for illustrating one embodiment of the present invention, not intended to limit the scope thereof. Any variation and derivation from the above description and drawings should be included in the scope of the present invention.

What is claimed is:

1. A tool fixing mechanism comprising:

(a) a hollow grip, said grip having an elliptic cross-section, a front end and a rear end, the front end being formed with a slot, while the rear end being formed with a cross-shaped socket, two windows being respectively formed on the top and bottom walls of the rear end of the grip in the short axis direction of said elliptic cross-section; and (b) a resilient clip body, said resilient clip body being located in the cross-shaped socket of the grip, consisting of an upper plate body, a lower plate body, a fixing shaft and a resilient member, the fixing shaft being connected at the middle portions of the upper and lower plate bodies and disposed at the pivot portion via the resilient member, the opposite inner sides of the front ends of the upper and lower plate bodies being respectively formed with two reverse hooks inclined toward the rear ends, the opposite outer sides of the rear ends of the upper and lower plate bodies being respectively formed with two lugs extending out of the windows of the grip.

2. A tool fixing mechanism as claimed in claim 1, wherein the resilient member is a V-shaped steel plate with a notch, each free end of the steel plate being formed with a convex strip on an inner side, a through hole being formed between the middle portion and the rear end of each of the upper and lower-plate bodies, the two free ends of the resilient member being respectively passed through the through holes of the upper and lower plate bodies with the convex strips engaged with the recesses formed on outer sides of the front ends of the upper and lower plate bodies, whereby the opening of the resilient member is faced to the front ends of the upper and lower plate bodies.

3. A tool fixing mechanism as claimed in claim 1, wherein each reverse hook is disposed with a back slope face.

\* \* \* \* \*